United States Patent
Viktorov

(10) Patent No.: US 10,715,540 B2
(45) Date of Patent: Jul. 14, 2020

(54) PROTECTION FROM MALICIOUS AND/OR HARMFUL CONTENT IN CLOUD-BASED SERVICE SCENARIOS

(71) Applicant: F-Secure Corporation, Helsinki (FI)

(72) Inventor: Dmitriy Viktorov, Helsinki (FI)

(73) Assignee: F-Secure Corporation, Helsinki (FI)

( * ) Notice: Subject to any disclaimer, the term of this patent is extended or adjusted under 35 U.S.C. 154(b) by 0 days.

(21) Appl. No.: 16/019,786

(22) Filed: Jun. 27, 2018

(65) Prior Publication Data
US 2019/0007438 A1 Jan. 3, 2019

(30) Foreign Application Priority Data
Jun. 29, 2017 (GB) .................................. 1710378.9

(51) Int. Cl.
| | | |
|---|---|---|
| *H04L 9/00* | (2006.01) | |
| *H04L 29/06* | (2006.01) | |
| *G06F 21/56* | (2013.01) | |
| *G06F 21/53* | (2013.01) | |
| *G06F 21/55* | (2013.01) | |

(52) U.S. Cl.
CPC .......... *H04L 63/1425* (2013.01); *G06F 21/53* (2013.01); *G06F 21/554* (2013.01); *G06F 21/564* (2013.01); *G06F 21/565* (2013.01); *H04L 63/1433* (2013.01); *H04L 63/20* (2013.01)

(58) Field of Classification Search
USPC .......................................................... 726/22
See application file for complete search history.

(56) References Cited

U.S. PATENT DOCUMENTS

| | | | |
|---|---|---|---|
| 8,276,202 B1 | 9/2012 | Dubrovsky et al. | |
| 8,650,650 B1* | 2/2014 | Pavlyushchik | ....... G06F 21/562 |
| | | | 726/22 |
| 2015/0205964 A1 | 7/2015 | Eytan et al. | |
| 2016/0048683 A1 | 2/2016 | Sanders et al. | |
| 2017/0070506 A1* | 3/2017 | Reddy | ..................... H04L 63/10 |
| 2017/0142139 A1* | 5/2017 | Dubrovsky | ......... H04L 63/0245 |
| 2018/0025157 A1* | 1/2018 | Titonis | ..................... G06F 21/56 |
| | | | 726/24 |
| 2018/0248940 A1* | 8/2018 | Cahana | ............... H04L 67/1031 |
| 2018/0253458 A1* | 9/2018 | Goyal | ............... G06F 17/30345 |

FOREIGN PATENT DOCUMENTS

| | | |
|---|---|---|
| GB | 2554657 A | 4/2018 |
| WO | WO 2017/112991 A1 | 7/2017 |

\* cited by examiner

*Primary Examiner* — Christopher J Brown
(74) *Attorney, Agent, or Firm* — Harrington & Smith

(57) ABSTRACT

There are provided measures for protection from malicious and/or harmful content in cloud-based service scenarios. Such measures exemplarily include detecting a transmission attempt of a file between a service cloud entity and a remote accessing entity, identifying said file, selecting between a synchronous file scanning and an asynchronous file scanning for said file based on at least one of: a file size, a file type, an extension type and predetermined security policies, and receiving security threat scan result for said file and storing said security threat scan result for said file in the scan result memory.

20 Claims, 8 Drawing Sheets

PROTECTION FROM MALICIOUS AND/OR HARMFUL CONTENT IN CLOUD-BASED SERVICE SCENARIOS

FIELD

The present invention relates to measures (including methods, apparatuses and computer program products) for realizing protection from malicious and/or harmful content in cloud-based service scenarios.

BACKGROUND

The present specification generally relates to security in relation to data uploaded to a service cloud (i.e. a cloud-based service entity providing at least (but not limited to) file services, e.g. download and upload of files) and stored there and/or downloaded from the cloud via several interfaces and transmission services. In modern communication networks, security is a vital issue, and attacks on network and data security tend to be increasing in terms of both number and complexity.

Salesforce.com ("Salesforce")® is the most commonly used enterprise cloud ecosystem. It is noted that although problems underlying the present invention are explained on the basis of Salesforce® as an example of a file service cloud (or more general service cloud providing e.g. software as a service (SaaS), platform as a service (PaaS)), these problems presently also arise from comparable other cloud solutions.

Salesforce® has started as a customer relationship management (CRM) software in the cloud, and turned into PaaS, allowing organizations design and customize their business processes without no software evolved. According to this concept, leveraging Salesforce application programming interfaces (API), Apex (a proprietary Java®-like programming language), and VisualForce® (a special tool to design Salesforce® user interface (UI) pages), organizations can extend functionality of Salesforce platform and integrate it with internal/external systems.

Salesforce® provides for an easy installation of applications to enhance the Salesforce® basic system of a certain customer. The applications are provided by an application exchange service ("AppExchange").

Examples for such applications range from integrations with various systems (such as MS Office 365®, Dropbox®, Evernote®) to encryption, data loss prevention, user activity and monitoring.

Being a business platform for many organizations enabling direct interaction for and with their partners and customers, Salesforce® as well as similar platforms are assumed to be an attractive target for cyber criminals to conduct targeted attacks. Attackers may for example use the platform as a stepping stone to get inside organization networks via respective cloud services. For example, one possible scenario of such an attack would be by sending an email message with a specifically crafted document or a web link to the organization's customer care/support system, tempting a support engineer to open it.

Providing means impeding or avoiding such attack and being able to interact with the cloud's basic system via established interfaces would increase security of the cloud system.

Accordingly, it is a general task of the present application to provide for such security increasing measures.

Known approaches being so-called cloud access security brokers (CASB) which may be implemented as Hyper Text Transfer Protocol Secure (HTTPS) reverse-proxy acting as a gateway (GW) 13 between a client/user (i.e. a remote accessing entity) 11 and the cloud (e.g. a service cloud entity) 12 as shown in FIG. 1. An obvious weakness of the approach using CASB is that an attacker can bypass the GW 13 and connect the cloud 12 directly.

In a different approach, in incoming file upon an upload is scanned utilizing resources of the cloud during the upload handling. However, according to such approach a risk and thus a problem arises that malicious or harmful content might not be detected immediately in a file upon an upload. As an example for such situation, there might be unknown zero-day vulnerability exploited by malware that an antivirus or other security tool cannot detect until the exploit becomes available for security researchers. Hence, there is a potential risk that even later on (after the exploit became available for security researchers) the malicious or harmful content may be downloaded by users to their computers and malware may spread inside organization.

A multi-tenant cloud platform like Salesforce® (and similar cloud systems) puts some constraints on how malware scanning and advanced threat analysis can be implemented in efficient way. Further, the above-mentioned Apex runtime engine may enforce governor limits to ensure that 3rd party code and processes does not monopolize shared resources.

Although Salesforce.com® is considered a secure platform covering various aspects of system and application level security, such as authentication, rules, user permission and roles, and is able to secure data at rest, in use an in motion, however, their cloud platform cannot guarantee content security and it becomes each organization's own responsibility to inspect files and web links uploaded to Salesforce.com® and prevent malicious or disallowed content spreading inside or outside the organization.

To address risks associated with harmful content shared via cloud-based services, F-Secure® has developed a cloud protection solution which compliments the native security capabilities of Salesforce.com® and allows to scan files and URLs posted or opened/downloaded by internal or external users. The solution also provides rich reporting, advanced security analytics and full audit trails, ensuring that incident response is fast and efficient.

The F-Secure cloud protection solution comprises a native Salesforce® application and an F-Secure Security Cloud, which provides content reputation and security services used in other F-Secure and $3^{rd}$ party products. The application is provisioned via Salesforce AppExchange and can be installed by the administrator to organization's Salesforce instance.

Due to native cloud-to-cloud integration, F-Secure Cloud Protection provides the best protection possible without hindering the use of Salesforce.com. Leveraging internal interfaces of the platform and innovative file scanning logic described in a patent application GB1616665.4, the application brings minimum impact to Salesforce performance and user experience.

Although the F-Secure cloud protection provides benefits when compared with traditional Cloud Access Security Broker (CASB) solutions, it has some drawbacks. because of the execution governors and limits of Salesforce.com®, the existing Cloud Protection application is not capable to scan very large or huge files. More specifically, there is a maximum amount of data and a maximum timeout for REST API callouts that does not allow to send larger files to the security cloud. Moreover, the Salesforce.com® does not allow to split and read large files in smaller data pieces. Files are stored as BLOB data in Salesforce.com® and can only be converted to Base64 string, which would be difficult to handle. Salesforce's Apex runtime puts a limit on memory heap size and opening a large file within Apex code would produce a system exception.

Hence, overcoming the shortcomings of the existing cloud protection solution and enabling efficient and reliable scanning of files uploaded or downloaded to/from a cloud platform like the Salesforce® platform and especially concerning also large files are required. Further, a cloud protection solution allowing optimization of the whole file scanning logic and making the application adaptable and still using cloud resources efficiently is needed.

SUMMARY

Various exemplifying embodiments of the present invention aim at addressing at least part of the above issues and/or problems and drawbacks.

In particular, according to these embodiments, a reliable protection against malware, advanced threats, and even data leakage can be provided without significant impact to performance and user experience in respect to the basic cloud service.

Various aspects of exemplifying embodiments of the present invention are set out in the appended claims.

According to an exemplary aspect of the present invention, there is provided a method of a direct service integration entity in a service cloudentity according to claim 1.

According to an exemplary aspect of the present invention, there is provided an apparatus according to claim 11.

According to an exemplary aspect of the present invention, there is provided a non-transitory computer storage medium having stored thereon computer program code for implementing the method of claim 1 (according to claim 20).

A computer program product implementing the method may comprise or may be embodied as a tangible/non-transitory computer-readable (storage) medium or the like, on which the computer-executable computer program code is stored, and/or the program is directly loadable into an internal memory of the computer or a processor thereof.

Any one of the above aspects solve at least part of the problems and drawbacks identified in relation to the prior art. Further developments and/or modifications of the aforementioned example aspects of the present invention are set out herein with reference to the drawings and exemplifying embodiments of the present invention.

By way of exemplifying embodiments of the present invention, there is provided protection from malicious and/or harmful content in cloud-based service scenarios. More specifically, by way of exemplary embodiments of the present invention, there are provided measures and mechanisms for realizing protection from malicious and/or harmful content in cloud-based service scenarios.

Thus, improvement is achieved by methods, apparatuses and computer program products enabling/realizing protection from malicious and/or harmful content in cloud-based service scenarios.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

Figure 1:
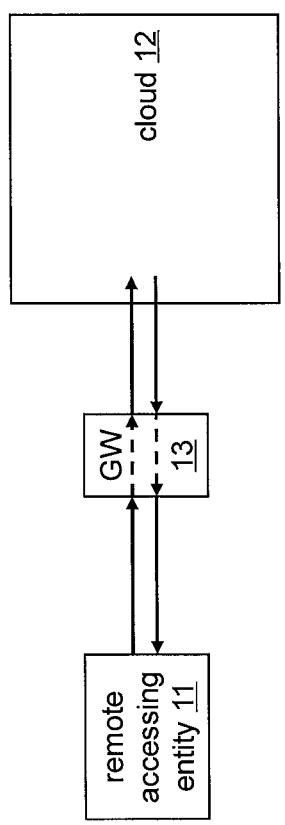
FIG. 1 is a block diagram illustrating an example of a system environment with signaling variants according to the cloud access security broker approach.

The present invention is described herein with reference to particular non-limiting examples and to what are presently considered to be conceivable embodiments of the present invention. A person skilled in the art will appreciate that the present invention is by no means limited to these examples, and may be more broadly applied.

Hereinafter, various exemplifying embodiments and implementations of the present invention and its aspects are described using several variants and/or alternatives. It is generally noted that, according to certain needs and constraints, all of the described variants and/or alternatives may be provided alone or in any conceivable combination (also including combinations of individual features of the various variants and/or alternatives). In this description, the words "comprising" and "including" should be understood as not limiting the described exemplifying embodiments and implementations to consist of only those features that have been mentioned, and such exemplifying embodiments and implementations may also contain features, structures, units, modules etc. that have not been specifically mentioned.

In the drawings, it is noted that lines/arrows interconnecting individual blocks or entities are generally meant to illustrate an operational coupling there-between, which may be a physical and/or logical coupling, which on the one hand is implementation-independent (e.g. wired or wireless) and on the other hand may also comprise an arbitrary number of intermediary functional blocks or entities not shown.

According to exemplifying embodiments of the present invention, in general terms, there are provided measures and mechanisms for (enabling/realizing) protection from malicious and/or harmful content in cloud-based service scenarios.

Figure 2:
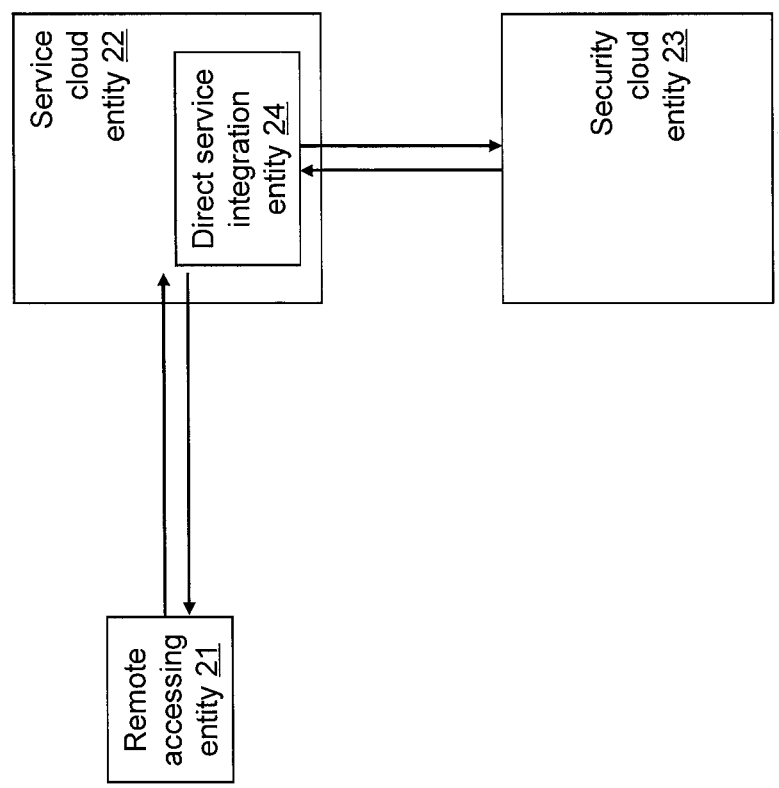
FIG. 2 shows a schematic diagram of an example of a system environment with signaling variants according to exemplary embodiments of the present invention.

FIG. 2 shows a schematic diagram illustrating a system configuration underlying exemplifying embodiments of the present invention.

According to FIG. 2, in its most basic form, a remote accessing entity 21 is connected to a (file) service cloud entity 22 which provides at least file storage capability for the remote accessing entity 21.

The remote accessing entity 21 may be any user device which is capable of being connected to the service cloud entity 22.

The service cloud entity 22 provides cloud services like Salesforce® cloud framework, but is not limited to this implementation. As mentioned above, the service cloud entity 22 may provide any arbitrary cloud service (assembly).

In case of Salesforce®, the remote accessing entity 21 may be a terminal running e.g. a Salesforce® web application or a Salesforce® mobile application. The remote accessing entity 21 may further be a cloud/enterprise system connected via representational state transfer (REST) API and/or simple object access protocol (SOAP) API to the service cloud entity 22. The remote accessing entity 21 may further be an email and/or collaboration system connected via simple mail transfer protocol (SMTP) and/or simple mail transfer protocol secure (SMTPS) protocols to the service cloud entity 22.

The service cloud entity 22 may be provided with means hooking into the basic cloud service by means of objects, classes, triggers, links, etc. utilizing interfaces provided by the basic cloud service. In particular, the service cloud entity 22 may be provided with a direct service integration entity 24. The service cloud entity 22 provides interfaces, which are then used by the direct service integration entity 24 to intercept content and to send it over to a security cloud entity 23 which provides at least file scanning capability. Additionally, the direct service integration entity 24 employs an optimization apparatus (like caching) for example to avoid sending content which has been recently scanned.

Thereby, the service cloud entity 22 is connected to a security cloud entity 23 (via the direct service integration entity 24). The security cloud entity 23 may further provide file reputation determination capability, uniform resource locator (URL) reputation determination capability, URL categorization capability, and/or advanced threat analysis capability.

That is, the direct service integration entity 24 allows to intercept files uploaded or downloaded to/from the cloud service and to inspect the files for malware and other threats.

Either of the service cloud entity 22 (and in particular the direct service integration entity 24 thereof) and the security cloud entity 23 may be embodied by an apparatus 40 discussed below in relation to FIG. 4.

Figure 3:
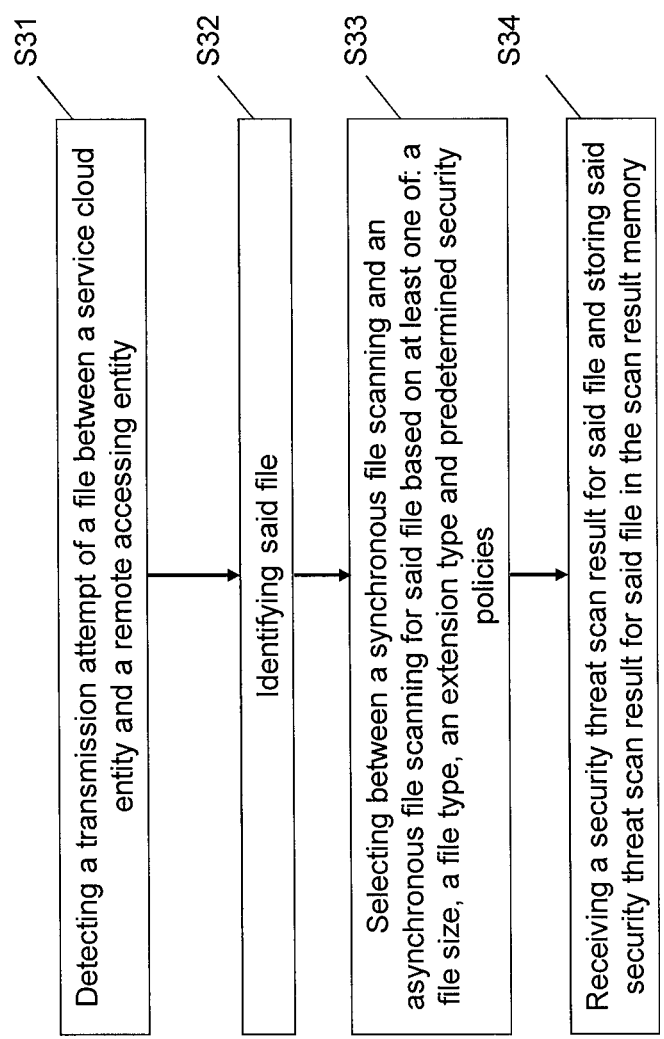
FIG. 3 is a schematic diagram of a procedure according to exemplary embodiments of the present invention.

FIG. 3 is a schematic diagram of a procedure for realizing a service cloudentity side component (namely the direct service integration entity 24) according to exemplary embodiments of the present invention.

As shown in FIG. 3, such a procedure according to exemplifying embodiments of the present invention comprises various operations at the direct service integration entity 24 illustrated in FIG. 2.

As shown in FIG. 3, a procedure according to exemplary embodiments of the present invention comprises an operation of detecting (S31) a transmission attempt of a file between a service cloudentity and a remote accessing entity, an operation of identifying (S32) said file, an operation of selecting (S33) between a synchronous file scanning and an asynchronous file scanning for said file based on at least one of: a file size, a file type, an extension type and predetermined security policies, and an operation of receiving (S34) a security threat scan result for said file and storing said security threat scan result for said file in the scan result memory.

According to a variation of the procedure shown in FIG. 3, said security threat scan result is provided with a time to live. According to such variation, an exemplary method according to exemplary embodiments of the present invention may further comprise an operation of removing said security threat scan result from said scan result memory, if said time to live is expired.

In an embodiment, the identifying operation (S32) according to exemplary embodiments of the present invention may comprise an operation of calculating a hash value for said file as an identifier of said file. Such hash value may be an SHA1 value, i.e., a hash value calculated utilizing an SHA1 method.

According to a variation of the procedure shown in FIG. 3, exemplary additional operations are given, which are inherently independent from each other as such. According to such variation, an exemplary method according to exemplary embodiments of the present invention may comprise an operation of evaluating said security threat scan result for said file.

In an embodiment, the detecting operation (S31) according to exemplary embodiments of the present invention may comprise an operation of receiving a trigger indicative of that said file is uploaded from said remote accessing entity to said service cloud entity.

Such exemplary evaluating operation according to exemplary embodiments of the present invention may, in case said file is assessed as malicious, comprise an operation of at least one of initiating an alert (e.g. to a user, an admin, etc., via e.g. an email or another communication channel), removing said file from said service cloud entity, and moving said file into a quarantine section of said service cloud entity.

In an embodiment, the detecting operation (S31) according to exemplary embodiments of the present invention may comprise an operation of receiving a trigger indicative of that said file is requested to be downloaded from said service cloud entity to said remote accessing entity, and an operation of setting a download allowance state for said file such that download of said file is prohibited.

In an embodiment, an evaluating operation according to exemplary embodiments of the present invention may comprise an operation of setting said download allowance state for said file such that said download of said file is permitted, in case said file is assessed as not malicious.

In an embodiment, the selecting (S33) between a synchronous file scanning and an asynchronous file scanning may further comprise selecting an asynchronous file scanning in case of at least one of: the size of said file exceeds a predetermined limit, the security threat scan for said file requires using a sandbox or the asynchronous file scanning method is required to avoid timeout exceptions.

In an embodiment, the synchronous file scanning further comprises sending data to the security cloud entity or enabling the security cloud entity reading data remotely from the service cloud entity.

In an embodiment, the asynchronous file scanning further comprises receiving, at the service cloud entity, notifications from the security cloud entity when security threat scan result for said file is completed by utilizing web callbacks or webhooks.

Salesforce.com® allows $3^{rd}$ party developers build different types of applications. Previously known cloud protection applications are designed as native apps. There are examples of solutions that are implemented as connected applications. Some of CASB solutions providing content security for Salesforce® users are neither of those app types and simply access data remotely via Salesforce.com REST/SOPA APIs, which is less secure and difficult to manage. A native app can scan files on upload or download pretty much in real-time. However, it runs within the Salesforce.com® limits and thus cannot handle large files. Connected or remote apps can scan large files, but scanning is done with regular intervals (e.g. once per minute) or in "near real-time" manner (with few seconds delay after a file upload).

To provide the best security and enable scanning also large files, the embodiments of the present invention enable building a "hybrid" application being of both the native and connected types. Based on file size, type or extension (e.g. archive) and security policies (app settings), the application may use either synchronous or asynchronous file scanning methods leveraging REST APIs provided by a special cloud-based backend. For example, when the user wants to upload a small document file, the application may handle it by calculating SHA1 digest, checking file reputation and if it's found unknown, sending the file content to F-Secure security cloud.

However, when the user wants to upload a very large or a huge file with the size bigger than a predetermined limit or a compound object (such as a ZIP archive) with many files included, the application may scan it asynchronously. Further, if a file requires thorough threat analysis requiring "detonation" it in the sandbox, the application may utilize asynchronous scanning methods to avoid timeout exceptions.

Additionally synchronous file scanning may be implemented supporting push and pull approaches. In the former case, the app may send data (push) to the backend and in the latter case, the backend may read data (pull) remotely. When performing an ansynchronous file scanning, the application may utilize web callbacks (webhooks) and get notified by the backend when the scanning is complete. The backend is capable to process multiple files simultaneously.

Regardless of the method, when file scanning is complete, threat analysis results will be saved in the scan result cache that may be maintained by Salesforce.com or some other party. If the same file is accessed (downloaded or uploaded by users) while the scan result is available in the cache, no "real" scanning will be performed. Results in the cache may be expired and automatically removed according to application settings.

In the following, exemplary embodiments of the present invention as discussed above are explained in more detail under reference to FIGS. 5 to 8. For such explanation, the above-mentioned scenario related to Salesforce® is used. However, it is noted that the present invention is not limited to an application to Salesforce® but may be implemented for comparable other cloud systems as well.

Figure 5:
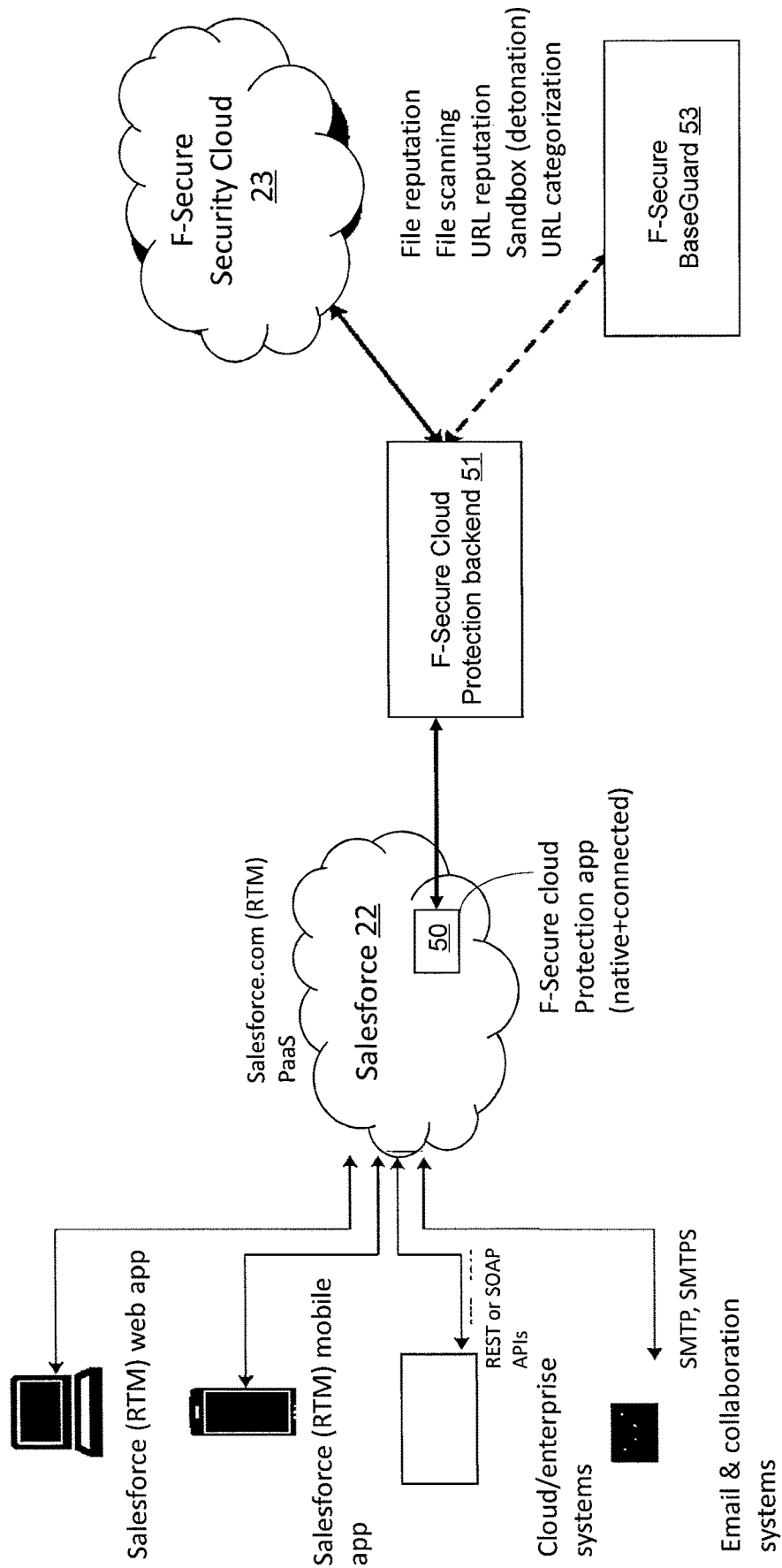
FIG. 5 is a schematic diagram of a system environment according to exemplary embodiments of the present invention.

FIG. 5 is a schematic diagram of a system environment according to exemplary embodiments of the present invention.

In particular, FIG. 5 shows a system including components according to the present invention to protect Salesforce® customers.

Here, it is noted that the stations (e.g. terminals, mobile devices) illustrated on the left correspond to the remote accessing entity 21 of FIG. 2.

Further, the Salesforce® cloud shown in the middle corresponds to the service cloud entity 22 of FIG. 2. It is noted that the F-Secure cloud protection app for Salesforce® 50 illustrated in the Salesforce® cloud corresponds to the means hooking into the basic cloud service by means of objects, classes, triggers, links, etc. utilizing interfaces provided by the basic cloud service (i.e., the direct service integration entity 24 of FIG. 2), and embodies the procedure described above in relation to FIG. 3.

Further, the F-Secure Security Cloud 23 shown on the right corresponds to the security cloud entity 23 of FIG. 2.

In an embodiment, the F-Secure cloud protection app 50 will be installed as both native and connected application. This means that after deploying the application from the Salesforce AppExchange, the administrator will need to enable an F-Secure cloud protection backend 51 to access data remotely. The backend 51 may use the standard OAuth 2.0 protocol to acquire access tokens for using Salesforce-.com APIs. The native app may use the same backend for both file and URL scanning.

In an embodiment, the F-Secure cloud protection backend 51 may run in a public cloud and utilize F-Secure security cloud 23 services to check file/URL reputation, scan files for malware and other threats and "detonate" suspicious content in the sandbox (e.g. SandViper). However, it is also possible to implement the cloud protection backend 51 as a software that is deployed in some other cloud. This may offer additional data privacy and confidentiality. In such cases, the F-Secure cloud protection backend 51 may utilize (or be bundled with) an F-Secure BaseGuard 53.

According to exemplary embodiments of the present invention, the above-mentioned means hooking into the basic cloud service (the direct service integration entity 24) may be embodied by the F-Secure application obtained from the Salesforce® AppExchange and deployed to the customers Salesforce® environment(s).

Once F-Secure application is successfully installed, all files uploaded or downloaded to/from Salesforce® are going to be scanned for malware and other advanced threats. According to exemplary embodiments of the present invention, it can be defined which file types, users or devices are excluded from scanning.

As is derivable from FIG. 5, the actual malware scanning and advanced threat analysis are off-loaded from the service cloud entity 22 (Salesforce® cloud) to the security cloud entity 23 (F-Secure Security Cloud). The F-Secure Security Cloud may provide multiple security services such as file reputation, malware scanning, URL reputation and categorization, advanced threat analysis (also known as "detonation in sandbox"). F-Secure application (i.e., the direct service integration entity 24) interacts with F-Secure Security Cloud service over REST-based APIs.

While above the means hooking into the basic cloud service is described as being embodied by the F-Secure application, other embodiments in which hardware components dedicated to these means (i.e., the direct service integration entity 24) are added to the service cloud (as the file service cloud entity) are encompassed as well. It is conceivable for the skilled person that these hardware components are not limited to functionality related to the F-Secure application, but instead may provide additional functionality.

Subsequently, details how file uploads are handled by component(s) of the direct service integration entity 24 (exemplarily embodied by the F-Secure application) are described under reference to FIGS. 6 to 8. Scanning files on download or other scenarios will reuse the key elements.

Figure 6:
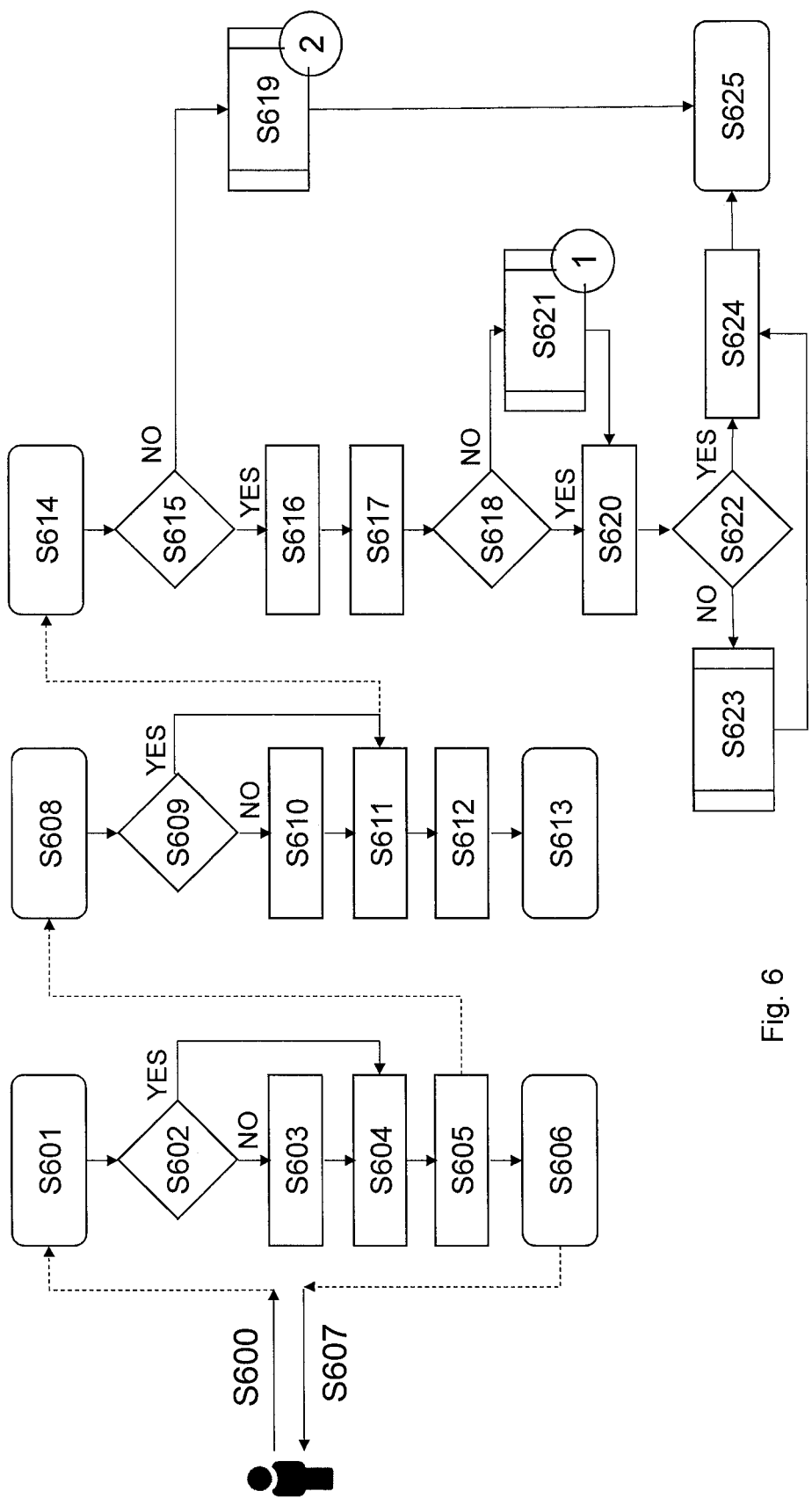
FIG. 6 is a schematic diagram of a procedure according to exemplary embodiments of the present invention.

FIG. 6 is a schematic diagram of a procedure according to exemplary embodiments of the present invention.

Namely, according to FIG. 6, main steps involved in processing a file (uploaded to Salesforce® from his/her device with e.g. the web browser or mobile application) according to exemplary embodiments of the present invention are depicted. It is noted that the files may be uploaded e.g. by means of Salesforce's Chatter, Files, Libraries, Content and Notes&Attachments pages.

With respect to FIG. 6, it is noted that the dashed lines point to steps, which happen in background and may be initiated by the Salesforce® platform, such as calling trigger handlers and running scheduled/queueable jobs. The steps carried out inside boxes marked with 1 and 2 are explained in more detail in relation to FIGS. 7 and 8.

As is derivable from FIG. 6, several triggers are fired, SHA1 checksums related to small files are calculated and compared (thereby identifying already present scanning results), and if no scanning result for an uploaded file is determined as being already present, a scanning task is given to the security cloud entity, and the content of the found scanning result or a scanning result delivered by the security cloud entity in response to the task is used for further steps in relation to security regarding the file in question (i.e. considering the file as safe, considering the file as unsafe, initiating administrator specified actions). However, in case of scanning larger files, the security cloud entity is given the task to scan these files asynchronously.

In S600 the user uploading a file to Salesforce® with the web browser or a mobile application is detected. In S601, an Apex trigger is fired for FeedItem/ContentVersion object with a content ID. If, in S602, the file is detected to be larger than X MB (can be configured via policies or applications settings) or compound, then S604 is entered. Otherwise, S603 is entered where SHA1 checksum of file is calculated by the given content ID. In S604, a new ContentScanJob object with "New" status and the content ID is created. In S605, the new ContentScanJob object with the content ID is added to the database. In S606, the FeedItem or ContentVersion trigger execution is complete. In S607, the user gets confirmation that the file upload is complete (ok).

In S608, an Apex trigger is fired for the new ContentScanJob object(s). If, in S609, the file is detected to be larger than X MB (can be configured via policies or applications settings) or compound, then S611 is entered where a new Scan Queueable Apex job with the list of content IDs to scan is created. In S610, a SHA1 checksum of content is calculated if it is not available and the ContentScanJob object is updated. In S612, the status of the ContentScanJob object is updated to "Pending". In S613, the ContentScanJob trigger execution is complete.

In S614, Salesforce® executes the Scan Queueable Apex job. If, in S615, SHA1 is not detected to be available, then S619 is entered. Otherwise, in S616 the list of SHA1 checksums passed to the job is retrieved. In S617, it is looked for Scan Result Cache objects with previous scan results by given SHA1 checksums. In S618, if previous scan results are not found, then S621 is entered. Otherwise, in S620, ContentScanJob objects by SHA1 checksums are found and the status is updated to "Complete" along with the scan result.

In S622, it is checked whether the content is found safe. If so, in S624, the scan results and actions taken are recorded to the Scan Log. If the content is not found safe in step S622, then S623, is entered where an admin specified action is taken, i.e., sending email alert to the user/admin, removing/quarantining the original content. Afterwards, the Scan Queueable Apex job is complete (S625).

Figure 7:
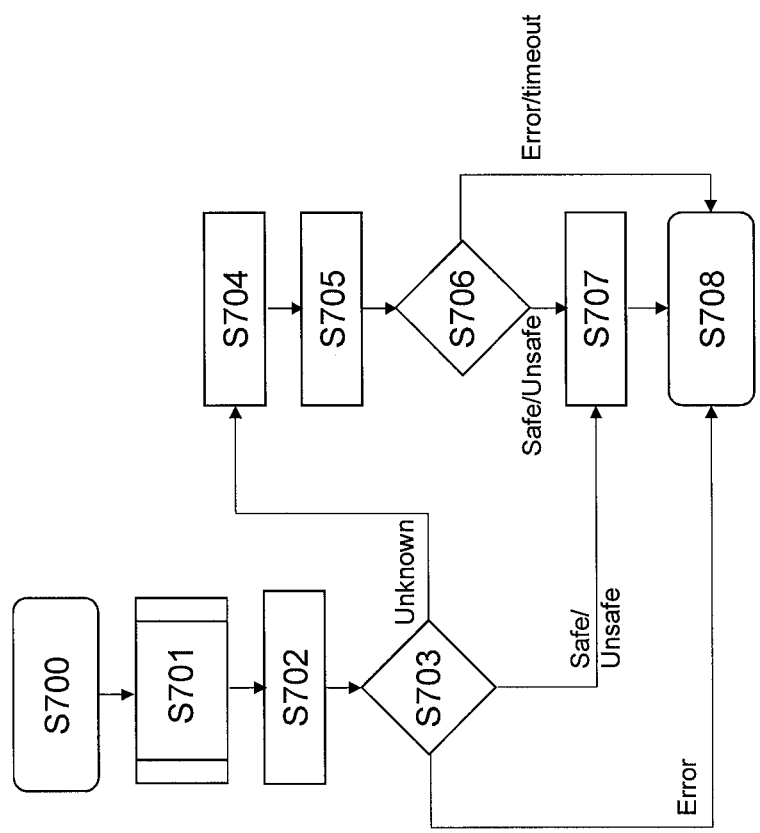
FIG. 7 is a schematic diagram of a procedure according to exemplary embodiments of the present invention.

FIG. 7 is a schematic diagram of a procedure according to exemplary embodiments of the present invention.

Namely, FIG. 7 illustrates the steps carried out inside S621 (marked with 1) of FIG. 6 related to scanning of small files (e.g. with sizes less than 12 MB) synchronously.

The example steps start at S700. In S701, API keys and other parameters to call F-Secure cloud service(s) are retrieved. In S702, SHA1 checksum is sent to the cloud protection backend and file reputation rating is retrieved.

If, in S703, the file reputation rating is detected to be unknown, then S704 is entered where the content of the file is read and sent to the cloud protection backend. In S705, it is awaited until the result of scanning for malware and advanced threats is ready. If, in S706, the scan results shows that the scanned content is Safe or Unsafe, then S707 is entered where a final verdict (Safe, Unsafe, Unknown) is calculated. If, in S706, an error or timeout is detected and S708 is entered where the method ends. However, in an embodiment, in case of an error or a timeout, the application may immediately initiate an asynchronous file scanning and ask the backend to do "pull" scanning.

If, in S703, the file reputation rating is detected to be Safe or Unsafe, then S707 is entered. If and Error is detected in S703, then S708 may be entered where the method ends.

Figure 8:
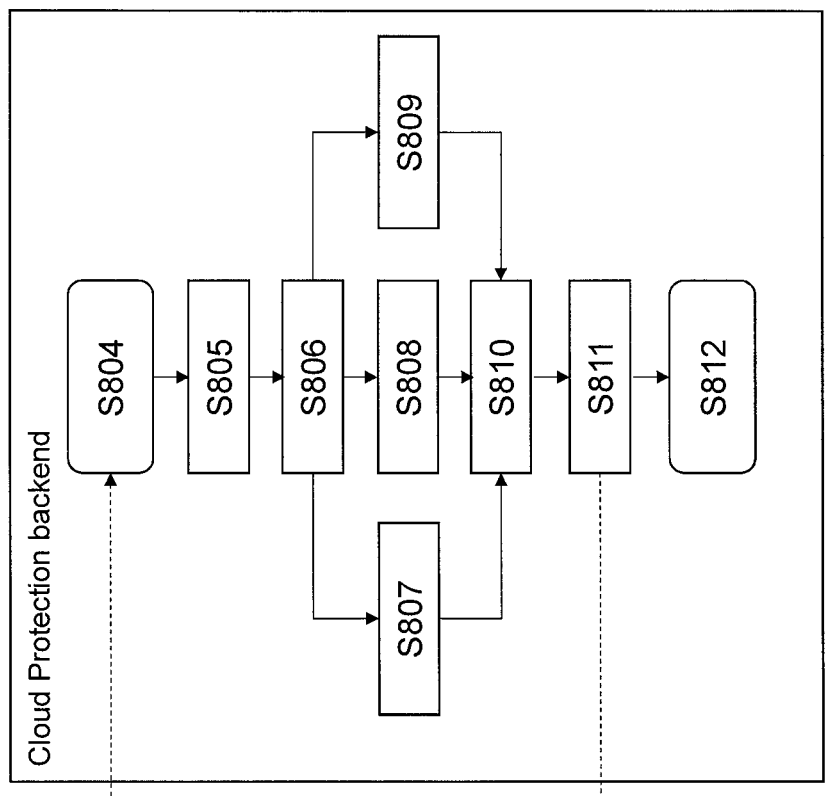
FIG. 8 is a schematic diagram of a procedure according to exemplary embodiments of the present invention.
Figure 8:
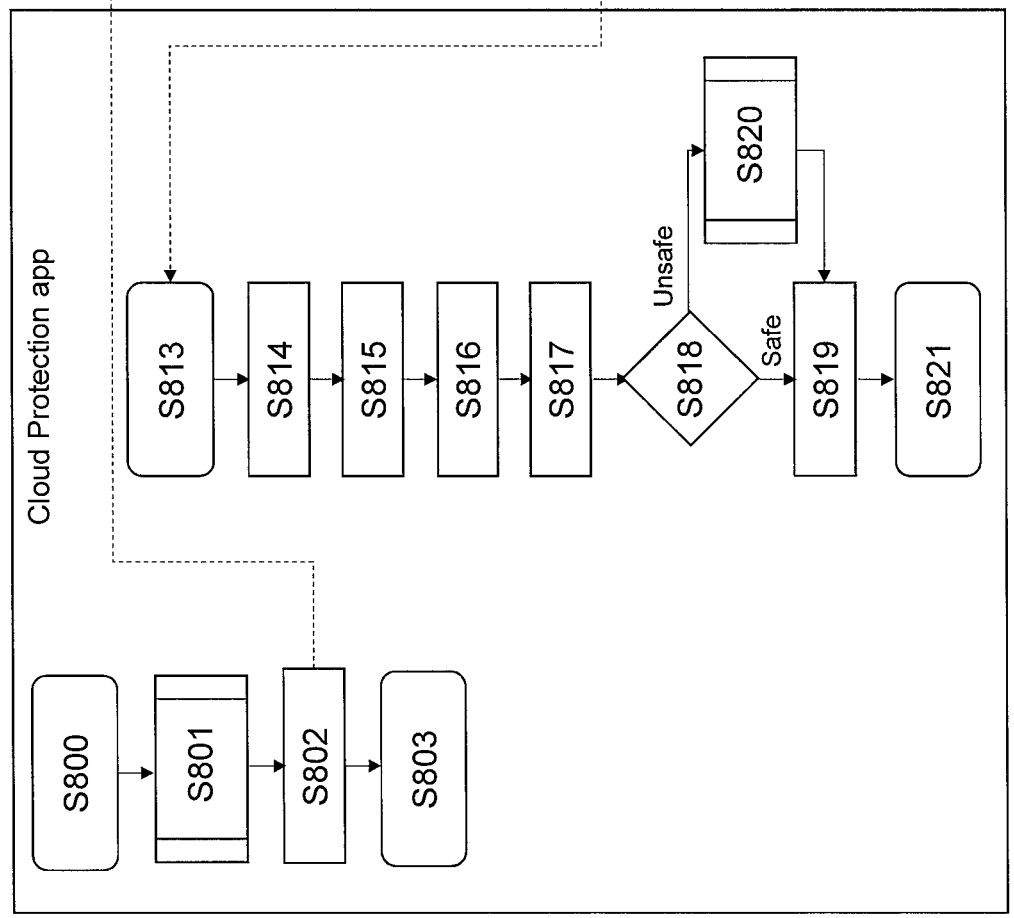

FIG. 8 is a schematic diagram of a procedure according to exemplary embodiments of the present invention.

Namely, FIG. 8 illustrates the steps carried out inside S619 (marked with 2) of FIG. 6 related to scanning of large files (e.g. with sizes bigger than 12 MB) asynchronously.

FIG. 8 explains how the exemplary F-Secure cloud protection application (i.e., the direct service integration entity 24) interacts with the F-Secure cloud protection backend to check a given file (content) for malware or other advanced threats according to exemplary embodiments of the present invention.

The first example steps from the start S800 to the end S803 are carried out by the cloud protection app. The method starts at S800. In 801, API keys and other parameters required to call F-Secure cloud service(s) are retrieved. In S802, content ID and other metadata is sent to the cloud protection backend along with the callback URI.

The following example steps from S804 to S812 are carried out by the cloud protection backend. In S804, the cloud protection backend starts processing. In S805, Salesforce.com is connected with access token obtained via OAuth.

In S806, the content of the file is read by given content ID. In S807, SHA1 checksum of the file content is calculated and the file reputation is checked. In S808, the file content is sent for malware scanning. In S809, the file is sent to be detonated in a sandbox (SandViper) if required. In S810, it is awaited until the results are ready and after that the results of file reputation, scanning for malware and sandbox scanning are collected. In S811, the result is sent to the cloud protection app via the given callback URI. In S812, the cloud protection backend completes the file scanning task.

The final example steps from the start S813 to the end S821 are carried out by the cloud protection app. In S814, the results of file reputation, scanning for malware and sandbox scanning are received from the cloud protection backend. In S815, SHA1 of file is updated in ContentVersion object. In S816, ContentScanJob objects by content ID are found and the status is updated to "Complete" along with the scan result. In 817, the scan result is saved/updated in the cache by SHA1 checksum. In S818, it is checked whether the content is found safe. If so, in S819, the scan results are recorded to the Scan Log. If the content is not found safe in step S818, then S820 is entered where an admin specified action is taken, i.e., sending email alert to the user/admin, removing/quarantining the original content. The method ends in S821.

The actual upload or download of the intended file may be suspended until it is determined that the file is considered safe. In the meantime, the user may be redirected to a substitution page (e.g. "scan in progress" page).

Further, in case the intended file is considered unsafe, the user may be redirected to a further substitution page (e.g. "content blocked" page). In such case, download of the file will not be permitted.

Further, in case the scanning has failed for any reason, the user may be redirected to another substitution page (e.g. "scan failed" page). In such case, download of the file may not be permitted as well.

The above-described procedures and functions may be implemented by respective functional elements, entities, modules, units, processors, or the like, as described below.

While in the foregoing exemplifying embodiments of the present invention are described mainly with reference to methods, procedures and functions, corresponding exemplifying embodiments of the present invention also cover respective apparatuses, entities, modules, units, nodes and systems, including both software and/or hardware thereof.

Respective exemplifying embodiments of the present invention are described below referring to FIG. 4, while for the sake of brevity reference is made to the detailed description of respective corresponding configurations/setups, schemes, methods and functionality, principles and operations according to FIGS. 1 to 3 and 5 to 8.

Figure 4:
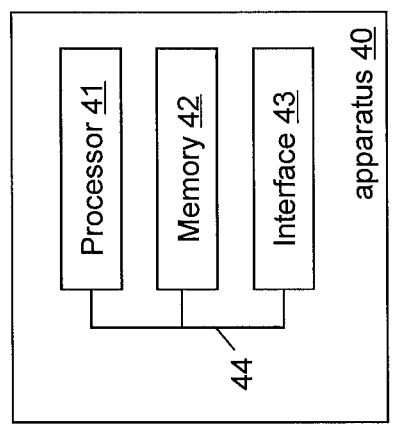
FIG. 4 is a block diagram illustrating an apparatus according to exemplary embodiments of the present invention.

In FIG. 4, the solid line blocks are basically configured to perform respective methods, procedures and/or functions as described above. The entirety of solid line blocks are basically configured to perform the methods, procedures and/or functions as described above, respectively. With respect to FIG. 4, it is to be noted that the individual blocks are meant to illustrate respective functional blocks implementing a respective function, process or procedure, respectively. Such functional blocks are implementation-independent, i.e. may be implemented by means of any kind of hardware or software or combination thereof, respectively.

Further, in FIG. 4, only those functional blocks are illustrated, which relate to any one of the above-described methods, procedures and/or functions. A skilled person will acknowledge the presence of any other conventional functional blocks required for an operation of respective structural arrangements, such as e.g. a power supply, a central processing unit, respective memories, a display, or the like. Among others, one or more memories are provided for storing programs or program instructions for controlling or enabling the individual functional entities or any combination thereof to operate as described herein in relation to exemplifying embodiments.

In general terms, respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

In view of the above, the thus illustrated devices/apparatuses are suitable for use in practicing one or more of the exemplifying embodiments of the present invention, as described herein.

FIG. 4 shows a schematic diagram illustrating an example of a structure of an apparatus according to exemplifying embodiments of the present invention.

As indicated in FIG. 4, an apparatus 40 according to exemplifying embodiments of the present invention may comprise at least one processor 41 and at least one memory 42 (and possibly also at least one interface 43), which may be operationally connected or coupled, for example by a bus 44 or the like, respectively.

The processor 41 of the apparatus 40 is configured to read and execute computer program code stored in the memory 42. The processor may be represented by a CPU (Central Processing Unit), a MPU (Micro Processor Unit), etc., or a combination thereof. The memory 42 of the apparatus 40 is configured to store computer program code, such as respective programs, computer/processor-executable instructions, macros or applets, etc. or parts of them. Such computer program code, when executed by the processor 41, enables the apparatus 40 to operate in accordance with exemplifying embodiments of the present invention. The memory 42 may be represented by a RAM (Random Access Memory), a ROM (Read Only Memory), a hard disk, a secondary storage device, etc., or a combination of two or more of these. The interface 43 of the apparatus 40 is configured to interface with another apparatus and/or the user of the apparatus 40. That is, the interface 43 may represent a communication interface (including e.g. a modem, an antenna, a transmitter, a receiver, a transceiver, or the like) and/or a user interface (such as a display, touch screen, keyboard, mouse, signal light, loudspeaker, or the like).

The apparatus 40 may, for example, represent a (part of a) system, such as (a component of) the service cloud entity 22 (in particular the direct service integration entity 24) in FIG. 2, or may represent a (part of a) the security cloud entity 23 in FIG. 2. The apparatus 40 may be configured to perform a procedure and/or exhibit a functionality as described in any one of FIGS. 3 and 5 to 8.

When representing the (component of the) service cloud entity 22 (in particular the direct service integration entity 24), the apparatus 40 or its processor 41 (possibly together with computer program code stored in the memory 42), in its most basic form, is configured to detect a transmission attempt of a file between a service cloud entity and a remote accessing entity, to identify said file, to select between a synchronous file scanning and an asynchronous file scanning for said file based on at least one of: a file size, a file type, an extension type and predetermined security policies; and to receive, from said security cloud entity, said security threat scan result for said file and storing said security threat scan result for said file in the scan result memory.

When representing the (part of the) security cloud entity 23, the apparatus 40 or its processor 41 (possibly together with computer program code stored in the memory 42), in its most basic form, is configured to provide at least file scanning capability.

Accordingly, any one of the above-described schemes, methods, procedures, principles and operations may be realized in a computer-implemented manner.

Any apparatus according to exemplifying embodiments of the present invention may be structured by comprising respective units or means for performing corresponding operations, procedures and/or functions. For example, such means may be implemented/realized on the basis of an apparatus structure, as exemplified in FIG. 4 above, i.e. by one or more processors 41, one or more memories 42, one or more interfaces 43, or any combination thereof.

For further details regarding the operability/functionality of the individual elements according to exemplifying embodiments of the present invention, reference is made to the above description in connection with any one of FIGS. 1 to 3 and 5 to 8, respectively.

According to exemplifying embodiments of the present invention, any one of the processor, the memory and the interface may be implemented as individual modules, chips, chipsets, circuitries or the like, or one or more of them can be implemented as a common module, chip, chipset, circuitry or the like, respectively.

According to exemplifying embodiments of the present invention, a system may comprise any conceivable combination of the thus depicted devices/apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Such software may be software code independent and can be specified using any known or future developed programming language, such as e.g. Java®, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or units, means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible or non-transitory medium such as a computer-readable (storage) medium having stored thereon a respective data structure or code means/portions or embodied in a signal or in a chip, potentially during processing thereof. A computer program product encompasses a computer memory encoded with executable instructions representing a computer program for operating/driving a computer connected to a network.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for protection from malicious and/or harmful content in cloud-based service scenarios. Such measures exemplarily comprise detecting a transmission attempt of a file between a service cloud entity and a remote accessing entity, identifying said file, selecting between a synchronous file scanning and an asynchronous file scanning for said file based on at least one of: a file size, a file type, an extension type and predetermined security policies (wherein the synchronous file scanning comprises calculating a hash value for said file as an identifier of said file, checking for presence of a security threat scan result for said file in a scan result memory based on a result of said identifying, and transmitting, based on a result of said checking, a security threat scan task for said file to a security cloud entity connected to said service cloud entity; and wherein the asynchronous file scanning comprises transmitting a security threat scan task for said file to the security cloud entity connected to said service cloud entity for scanning said file asynchronously) and receiving, from said security cloud entity, said security threat scan result for said file and storing said security threat scan result for said file in the scan result memory.

Even though the invention is described above with reference to the examples and exemplifying embodiments with reference to the accompanying drawings, it is to be understood that the present invention is not restricted thereto. Rather, it is apparent to those skilled in the art that the above description of examples and exemplifying embodiments is for illustrative purposes and is to be considered to be exemplary and non-limiting in all respects, and the present invention can be modified in many ways without departing from the scope of the inventive idea as disclosed herein.

LIST OF ACRONYMS AND ABBREVIATIONS

API application programming interfaces
BLOB Binary Large OBject
CASB cloud access security brokers
CRM customer relationship management
GW gateway
HTTPS Hyper Text Transfer Protocol Secure
PaaS platform as a service
REST representational state transfer
SaaS software as a service
SMTP simple mail transfer protocol
SMTPS simple mail transfer protocol secure
SOAP simple object access protocol
UI user interface
URI uniform resource identifier
URL uniform resource locator

The invention claimed is:

1. A security threat scanning method of a direct service integration entity in a service cloud entity, the method comprising at the direct service integration entity:
  detecting a transmission attempt of a file between said service cloud entity and a remote accessing entity, wherein transmitting files from the service cloud entity to a security cloud entity connected to said service cloud entity is prohibited for files exceeding a predetermined file limit;
  identifying said file;
  selecting between a synchronous file scanning and an asynchronous file scanning for said file based on a file size, wherein the asynchronous file scanning is selected if the size of said file size exceeds a predetermined limit;
    wherein the synchronous file scanning comprises calculating a hash value for said file as an identifier of said file, checking a scan result memory for presence of a security threat scan result for said file based on a result of said identifying; and based on a result of said checking determining no presence in said scan result memory of a security threat scan result for said file, transmitting a security threat scan task for said file to a security cloud entity connected to said service cloud entity implementing said asynchronous file scanning at said service cloud entity and, wherein implementing the asynchronous file scanning comprises transmitting a security threat scan task for said file to the security cloud entity connected to said service cloud entity for scanning said file asynchronously; and receiving, from said security cloud entity, said security threat scan result for said file and storing said security threat scan result for said file in the scan result memory.

2. The method according to claim 1, wherein said security threat scan result is provided with a time to live, and the method further comprising removing said security threat scan result from said scan result memory, if said time to live is expired.

3. The method according to claim 1, further comprising evaluating said security threat scan result for said file.

4. The method according to claim 3, wherein in relation to said detecting, said method further comprises receiving a trigger indicative of that said file is uploaded from said remote accessing entity to said service cloud entity.

5. The method according to claim 3, wherein in relation to said detecting, said method further comprises receiving a trigger indicative of that said file is requested to be downloaded from said service cloud entity to said remote accessing entity, and setting a download allowance state for said file such that download of said file is prohibited.

6. The method according to claim 3, wherein in relation to said evaluating, said method further comprises in case said file is assessed as malicious, at least one of initiating an alert, removing said file from said service cloud entity, and moving said file into a quarantine section of said service cloud entity.

7. The method according to claim 3, wherein in relation to said evaluating, said method further comprises in case said file is assessed as not malicious, setting said download allowance state for said file such that said download of said file is permitted.

8. The method according to claim 1, wherein in relation to said selecting between a synchronous file scanning and an asynchronous file scanning, said method further comprises selecting an asynchronous file scanning in case of at least one of:

the size of said file exceeds a predetermined limit, the security threat scan for said file requires using a sandbox, the asynchronous file scanning method is required to avoid timeout exceptions.

9. The method according to claim 1, wherein the synchronous file scanning further comprises sending data to the security cloud entity or enabling the security cloud entity reading data remotely from the service cloud entity.

10. The method according to claim 1, wherein the asynchronous file scanning further comprises receiving, at the service cloud entity, notifications from the security cloud entity when security threat scan result for said file is completed by utilizing web callbacks or webhooks.

11. An apparatus comprising a memory configured to store computer program code, and a processor configured to read and execute computer program code stored in the memory, wherein the processor is configured to cause the apparatus to perform:

detecting a transmission attempt of a file between said service cloud entity and a remote accessing entity, wherein transmitting files from the service cloud entity to a security cloud entity connected to said service cloud entity is prohibited for files exceeding a predetermined file limit;

identifying said file;

selecting between a synchronous file scanning and an asynchronous file scanning for said file based on a file size, wherein the asynchronous file scanning is selected if the size of said file size exceeds a predetermined limit;

wherein the synchronous file scanning comprises calculating a hash value for said file as an identifier of said file, checking a scan result memory for presence of a security threat scan result for said file based on a result of said identifying, and based on a result of said checking determining no presence in said scan result memory of a security threat scan result for said file, transmitting a security threat scan task for said file to a security cloud entity connected to said service cloud entity implementing said asynchronous file scanning at said service cloud entity and;

wherein implementing the asynchronous file scanning comprises transmitting a security threat scan task for said file to the security cloud entity connected to said service cloud entity for scanning said file asynchronously; and receiving, from said security cloud entity, said security threat scan result for said file and storing said security threat scan result for said file in said scan result memory.

12. The apparatus according to claim 11, wherein said security threat scan result is provided with a time to live, and the processor is further configured to cause the apparatus to perform:

removing said security threat scan result from said scan result memory, if said time to live is expired.

13. The apparatus according to claim 11, wherein the processor is further configured to cause the apparatus to perform:

evaluating said security threat scan result for said file.

14. The apparatus according to claim 11, wherein in relation to said detecting, the processor is further configured to cause the apparatus to perform:

receiving a trigger indicative of that said file is uploaded from said remote accessing entity to said service cloud entity.

15. The apparatus according to claim 13, wherein in relation to said evaluating, the processor is further configured to cause the apparatus to perform:

in case said file is assessed as malicious, at least one of initiating an alert, removing said file from said service cloud entity, and moving said file into a quarantine section of said service cloud entity.

16. The apparatus according to claim 11, wherein in relation to said detecting, the processor is further configured to cause the apparatus to perform:
receiving a trigger indicative of that said file is requested to be downloaded from said service cloud entity to said remote accessing entity, and
setting a download allowance state for said file such that download of said file is prohibited.

17. The apparatus according to claim 13, wherein in relation to said evaluating, the processor is further configured to cause the apparatus to perform:
in case said file is assessed as not malicious, setting said download allowance state for said file such that said download of said file is permitted.

18. The apparatus according to claim 11, wherein in relation to said synchronous file scanning, the processor is further configured to cause the apparatus to perform:
sending data to the security cloud entity or enabling the security cloud entity reading data remotely from the service cloud entity.

19. The apparatus according to claim 11, wherein in relation to said asynchronous file scanning, the processor is further configured to cause the apparatus to perform:
receiving, at the service cloud entity, notifications from the security cloud entity when security threat scan result for said file is completed by utilizing web callbacks or webhooks.

20. A non-transitory computer storage medium having stored thereon computer program code, the computer program code executed by at least one processor implementing:
detecting a transmission attempt of a file between said service cloud entity and a remote accessing entity, wherein transmitting files from the service cloud entity to a security cloud entity connected to said service cloud entity is prohibited for files exceeding a predetermined file limit;
identifying said file;
selecting between a synchronous file scanning and an asynchronous file scanning for said file based on a file size, wherein the asynchronous file scanning is selected if the size of said file size exceeds a predetermined limit;
wherein the synchronous file scanning comprises calculating a hash value for said file as an identifier of said file, checking a scan result memory for presence of a security threat scan result for said file based on a result of said identifying, and; based on a result of said checking determining no presence in said scan result memory of a security threat scan result for said file, transmitting a security threat scan task for said file to a security cloud entity connected to said service cloud entity implementing said asynchronous file scanning at said service cloud entity and;
wherein implementing the asynchronous file scanning comprises transmitting a security threat scan task for said file to the security cloud entity connected to said service cloud entity for scanning said file asynchronously; and
receiving, from said security cloud entity, said security threat scan result for said file and storing said security threat scan result for said file in the scan result memory.

* * * * *